(12) United States Patent
Ramirez-Diaz

(10) Patent No.: US 8,240,328 B2
(45) Date of Patent: Aug. 14, 2012

(54) AUTOMATIC FLUID SPILL PREVENTION AND SHUT OFF SAFETY VALVE

(76) Inventor: Luis Guillermo Ramirez-Diaz, Caguas, PR (US)

(*) Notice: Subject to any disclaimer, the term of this patent is extended or adjusted under 35 U.S.C. 154(b) by 302 days.

(21) Appl. No.: 12/581,409

(22) Filed: Oct. 19, 2009

(65) Prior Publication Data

US 2011/0088801 A1 Apr. 21, 2011

(51) Int. Cl.
*F16K 31/128* (2006.01)

(52) U.S. Cl. ........... 137/492.5; 137/505.36; 137/614.14; 137/614.21; 137/624.12; 137/624.14; 137/624.18; 251/29

(58) Field of Classification Search .................. 137/485, 137/488, 492, 492.5, 505.26, 505.36, 614.11, 137/614.21, 624.11, 614.13, 614.14, 624.12, 137/624.13, 624.14, 624.18; 251/29
See application file for complete search history.

(56) References Cited

U.S. PATENT DOCUMENTS

| | | | |
|---|---|---|---|
| 2,899,972 A * | 8/1959 | Matthews | 137/495 |
| 4,572,255 A * | 2/1986 | Rabinovich | 141/217 |
| 5,004,014 A * | 4/1991 | Bender | 137/624.12 |
| 5,234,024 A * | 8/1993 | Stoltman et al. | 137/495 |
| 5,509,787 A * | 4/1996 | Valdes | 417/38 |
| 6,923,204 B2 * | 8/2005 | Dalton et al. | 137/489 |
| 7,681,860 B2 * | 3/2010 | Maercovich | 251/30.04 |

* cited by examiner

*Primary Examiner* — William McCalister

(57) ABSTRACT

A centralized automatic fluid or gas spill prevention and shut-off valve system that prevents line ruptures comprising means to reduce fluid pressures, such as gas, to appropriate levels, a continuous monitoring of downstream conditions, an immediate stop system of major spillage caused by excessive flow wherein said immediate stop system automatically shuts off the flow of fluids, means for timed shut off of minor fluid flows that exceed a predetermined amount of time and a restarting system that restarts when overflow conditions are corrected, wherein said restarting system works automatically or manually.

8 Claims, 4 Drawing Sheets

AUTOMATIC FLUID SPILL PREVENTION AND SHUT OFF SAFETY VALVE

STATEMENT REGARDING FEDERALLY SPONSORED RESEARCH AND DEVELOPMENT

N/A

RELATED APPLICATIONS

N/A

BACKGROUND OF THE INVENTION

1. Field of the Invention

The present invention is directed to a fluid flow control system comprising regulating systems and valves. More particularly to a fluid flow control system comprising a valve that automatically detects and prevents fluid spills by harnessing a particular effect of fluids through said valve.

2. Discussion of the Background

The distribution of fluids, such as gases, for residential and industrial use has always been subject to damages caused by lines and equipment failures, with major losses of fluids, damages to property, environmental hazards, and even loss of life. This is a known problem, and multiple solutions have been proposed such as; limited shut-off valves, distributed alarms based on electronic sensors, distributed alarms with solenoid based shut of valve, centralized computer based monitoring and shut-off electric valves. However some of these systems have installation difficulties, dependence of electricity and further the centralized ones are complex and expensive for general and wide use, while the simple shut-off valves have limited applications.

The shut-off valve method presented by Carson in U.S. Pat. No. 5,857,487 is an example of a simple valve intended to automatically shut off the water flow on an irrigation field in case of a pipe rupture. Although the valve is very simple and performs the intended shut-off in case of irrigation pipe rupture, it lacks the rupture prevention effect of the pressure regulator, easy and cost effective integration to present regulators designs, auto reset, and orientation independence for proper operation on the mayor rupture protection mode.

SUMMARY OF THE INVENTION

The present invention overcomes the disadvantages disclosed above by providing a valve that shuts off flow caused by broken lines or equipment and generates an optional alarm if such conditions occur. The present invention comprises a continuous monitoring of the flow conditions on the line and equipments, means for instantaneous shut off if a major spill is detected (as the flow exceeds a preset limit), and means for delayed shut off if a minor spill is detected as the flow is continuous and exceeds a preset time.

The present invention incorporates, combines and/or integrates 5 sub-systems to accomplish the detection and prevention of fluids leakage or spills. The integrated sub-systems comprise a sub-system and method using pressure regulators, a sub-system and method of continuous testing and monitoring of the line for over flows, a sub-system and method for automatic shut-off, a sub-system and method for normalizing fluid pressure and to detect flows that exceed time allowed, and a sub-system and method to automatically or manually reset the system when overflow conditions are corrected.

The pressure regulator sub-system and method is based on the industry standard diagram based regulator valve used for fluids such as gases. The present regulator system continuously monitors the downstream pressure by referencing it against a compression spring by the action of the downstream pressure against the diaphragm. The resulting continuous modulations of the diaphragm open or close the valve maintaining the desired pressure. Therefore one of the objects of the present invention is to provide a fluid flow control system that detects and prevents fluid leakages or spills comprising a pressure regulator system that opens or closes the valve maintaining the desired pressure.

The continuous measuring system and method continuously measures line overflows. Further the automatic shut-off systems shut off the system by the action of a second valve acting in opposing direction of the primary regulator valve. For the specified flow range of the regulator, this secondary valve has no effect on the flow, but if this flow range is exceeded then this second valve immediately shuts off the flow until good working systems conditions are re-established. Therefore, another object of the present invention is to provide a fluid flow control system that detects and prevents fluid leakages or spills comprising a continuous measuring system and an automatic shut-off system that continuously measures the line overflows and automatically shuts off the system.

The pressure normalization and timer sub-system comprises means to normalize fluid pressure and means for measuring the consistent hydraulic or pneumatic timing used, wherein said measured time is used to determined when to shut off a small flow that exceeded a set-up or predetermined time. The pressure normalization and timer sub-system measures and calculates the system's pressure differentials, wherein said differential value is used in the process to normalize said system pressure to a known value in order to maintain said system pressure timing independent from the upstream pressure fluctuations or downstream regulated pressure selection. Therefore; another object of the present invention is to provide a fluid flow control system that detects and prevents fluid leakages or spills comprising pressure normalization and a timer sub-system to normalize said system pressure to a known value.

The reset sub-system allows a very small flow when the valve shuts off after detecting a rupture, then when the failure condition is repaired said small flow will slowly re-pressurize the line and the system will be automatically restored. In the cases this is not desired for safety reasons (eg. natural gas) then the system can be manually reset after the condition is repaired. Therefore another object of the present invention is to provide a fluid flow control system that detects and prevents fluid leakages or spills comprising a reset system that can be automatically or manually restored.

The Applicant hereby asserts, that the disclosure of the present application may include more than one invention, and, in the event that there is more than one invention, that these inventions may be patentable and non-obvious one with respect to the other.

Further, the purpose of the accompanying abstract is to enable the U.S. Patent and Trademark Office and the public in general, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying drawings which are incorporated herein constitute part of the specifications and illustrate several embodiments of the invention.

DESCRIPTION OF THE PREFERRED EMBODIMENT

As mentioned before the present invention comprises a valve system to provide a fluid flow control system that detects and prevents spills of gases and/or liquids. The valve system is installed or connected to any system, such as a facility's main supply of fluid, wherein a fluid flow needs to be controlled. The valve system comprises several sub-systems, wherein said subsystems comprise a pressure regulator sub-system, a continuous measuring sub-system, means for automatic shut off of the sub-system, pressure normalization and timer sub-system, and a reset sub-system to automatic or manually reset the system when over flow conditions are corrected.

Figure 1:
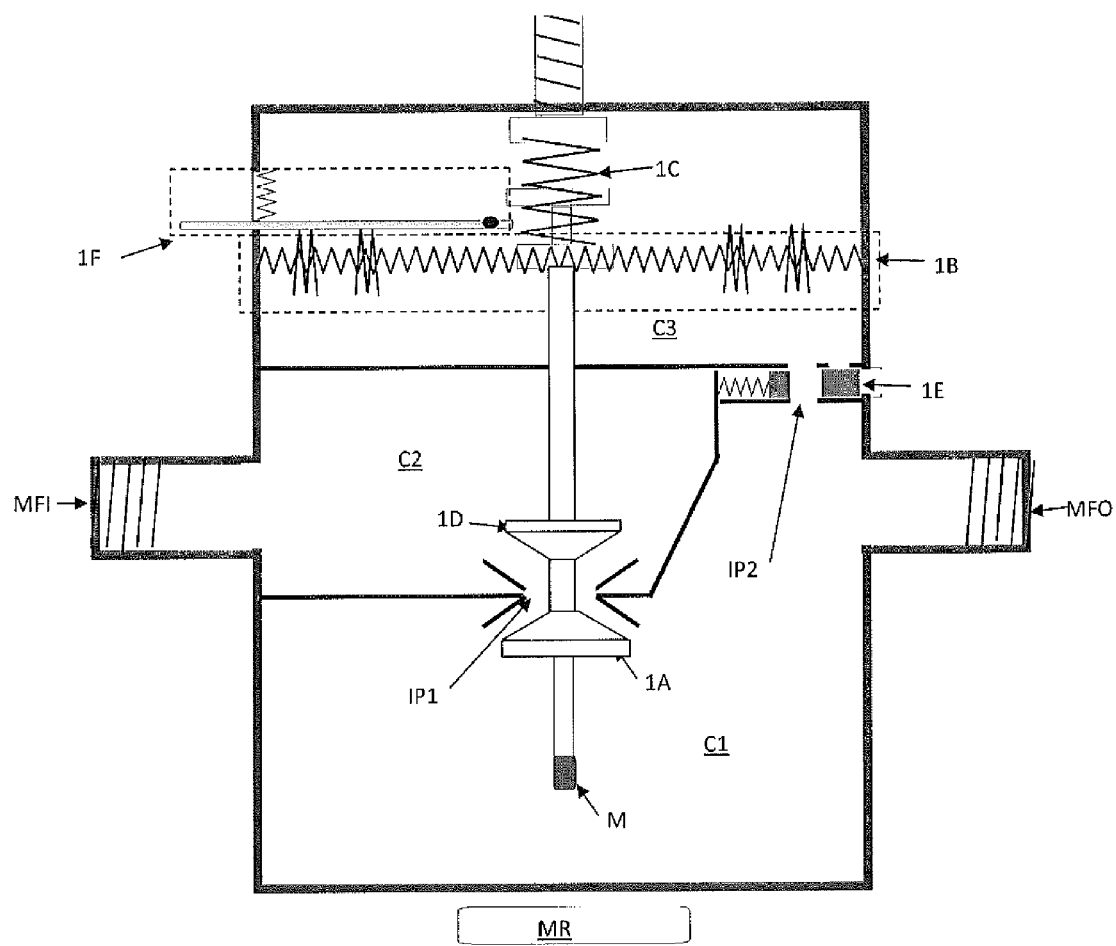
FIG. 1 shows a first embodiment of the pressure regulator valves for the present invention.

FIG. 1 shows the first embodiment of the present invention wherein a valve system comprising a main fluid inlet MFI, a main fluid outlet MFO, internal paths IP1, IP2, several chambers C1,C2,C3 and several sub-systems including, but not limited to, a pressure regulator system and/or method to regulate the valves pressure. The pressure regulator system comprises a several devices that regulate the flow, such as poppets 1A,1D and several resilient mechanisms providing reciprocal movement, such as a piston (not shown) or diaphragm 1B and a spring 1C. The main fluid inlet MFI with variable high pressure acts on the poppet valve 1A.

Simultaneously the pressure at the main fluid outlet MFO acts on the poppet 1A by means of a second control valve 1E. The pressure at the main fluid outlet MFO is transferred to the poppet 1A by means of diaphragm 1B, wherein said diaphragm 1B exerts a force on the poppet depending on the fluid pressure passing through a second internal path IP2 or the opening of said second control valve 1E which provides access to a diaphragm chamber C3. Additionally the spring 1C counteracts the forces on the diaphragm 1B due to a mechanical connection between these two parts. Mainly when the inlet pressure is reduced the diaphragm 1B moves downward promoting the displacement of the poppet 1A away from a first internal path IP1 which results in the opening of the valve increasing the flow and pressure on the main outlet MFO. At the same time the flow is bypassed to the diaphragm chamber C3 through said second internal path IP2 increasing the pressure on the diaphragm 1B and proportionally closing the poppet 1A until the pressures of the fluid and spring 1C acting on the diaphragm are balanced. The adjustment of the diaphragm screw downwards will increase regulated pressure, upwards will reduce downstream pressure. The present pressure regulator system and method provides a stable, simple, rugged, and reliable structure and method for reducing and regulating the pressure of any fluid such as gas.

Figure 2:
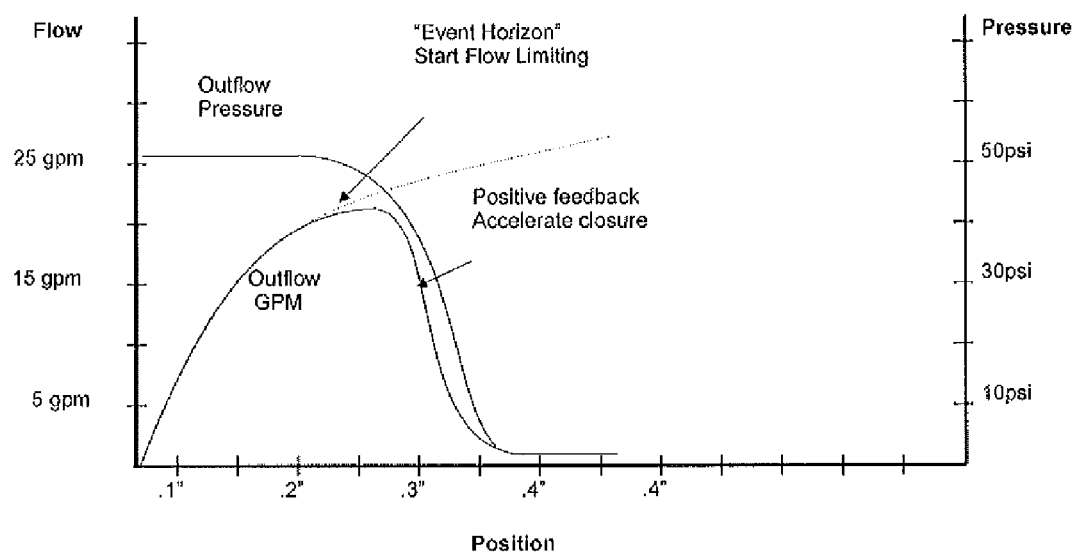
FIG. 2 shows a graph of pressure and flow with respect to position for the present invention.

The valve system further comprises a continuous measuring system and the automatic shut-off system. The continuous measuring and automatic shut-off system comprises a second valve and/or poppet 1D that operates in the opposite direction of the poppet 1A. The second poppet 1D is one of the main parts that protect the main system from the line or equipment failure combined with continuous automatic control and/or sensing of the downstream conditions and activation of protection as required by previous adjustment. As disclosed above and shown in FIG. 1, while the regulating action of the poppet 1A is taking effect, the poppet 1D works in the opposite direction. As long as the poppet 1D is sufficiently far from the valve opening, the poppet 1A operates in a normal way increasing or reducing flow as required by the regulating diaphragm 1B and spring 1C. As the poppet 1A continues to open or move away from the first internal path IP1 and due to the arrangement between the first poppet 1A and second poppet 1D, there is a point that the displacement of the first poppet 1A instead of increasing the flow starts reducing the flow due to the approaching of the poppet 1D to said first internal path IP1. What occurs at this point is an "event horizon", as shown in FIG. 2. When the system reaches the "event horizon" there is a fast positive feedback that will make the diaphragm 1B and spring 1C continue the opening of the first poppet 1A but second poppet 10 is the controlling factor that effectively is shutting off the flow. The valve system will continue to measure and sense line/equipment conditions even in this protective lock up mode until the downstream pressure is increased enough to limit the flow above the "event horizon" flow set up. The amount of flow at the "event horizon" can be easily adjusted by the separation or distance between the first poppet 1A and second poppet 1D. Shortening the distance between the poppets creates the shut-off effect for lower flows, increasing it creates the shut-off effect for higher flows.

A magnet M is attached to the first poppet 1A by mechanical means, such as a rod or any other mechanic body that physically connects the two parts. The magnet M is part of a magnetic relay MR that is normally open and attached to the bottom of the valve, wherein said relay activates effectively a signal indicating that the valve is shut off and in protection mode. The implementation of this effect is shown in one configuration, but there are multiple designs to accomplish this effect.

Further during normal system operation the control valve 1E, as shown in FIG. 1, located close to the second internal path IP2 can be activated forcing the system into protection mode. The control valve 1E returns back to its original position as soon as the flow is detected to be normalized, meaning that the system is fully pressurized, or in the case of an empty line, that there is no flow demand so the controlled "leak" fills and pressurizes the line to reset the valve. A control valve 1E is a characteristic of the system that allows to activate the protection modes by a timer, liquid activated logic devices, electrical apparatus and many others. In addition to failure protection, this method can also be used to limit flows to a preset level, by providing a high "leak" factor on second poppet 1D.

Figure 3:
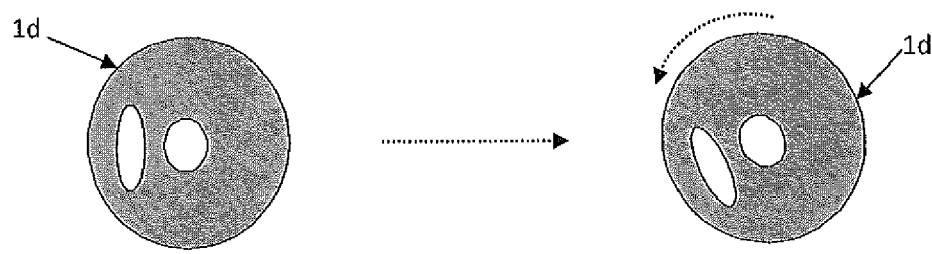
FIG. 3 shows a diagrammatic view of the adjustable fluid passage on a poppet by rotation of fluid path on said poppet.

The valve system additionally comprises a reset system. The reset systems comprises an adjustable fluid passage on the second poppet 1D by rotating the perforated top half of the second poppet 1D against the perforated bottom half as shown in FIG. 3, effectively creating a controlled leak on this poppet. The "leak" is selected to be small enough to limit flow when line/equipment still damaged but sufficient to fill the lines/equipment in a reasonable time. The small flow allowed by the controlled leak when the line/equipment failure is repaired, will effectively and gradually fill the line/equipment increasing pressures until diaphragm 1B and spring 1C are pushed upward opening second poppet 1D when the flow is low enough to avoid the high flow that triggers the protective shut-off on the "event horizon" conditions. It is important to understand that the reset can also be achieved by other means such as a bypass conduit manually or electrically activated. For example, a manual reset system, as shown in FIG. 1, comprises a lever 1F. In the instant case a force is exerted at the poppets 1A,1D, by pushing down the lever 1F, wherein said force (with a large lever ratio) provides an upward movement of the second poppet 1D, forcing open flow. If failure condition downstream was solved, then the system will be restored.

Figure 4:
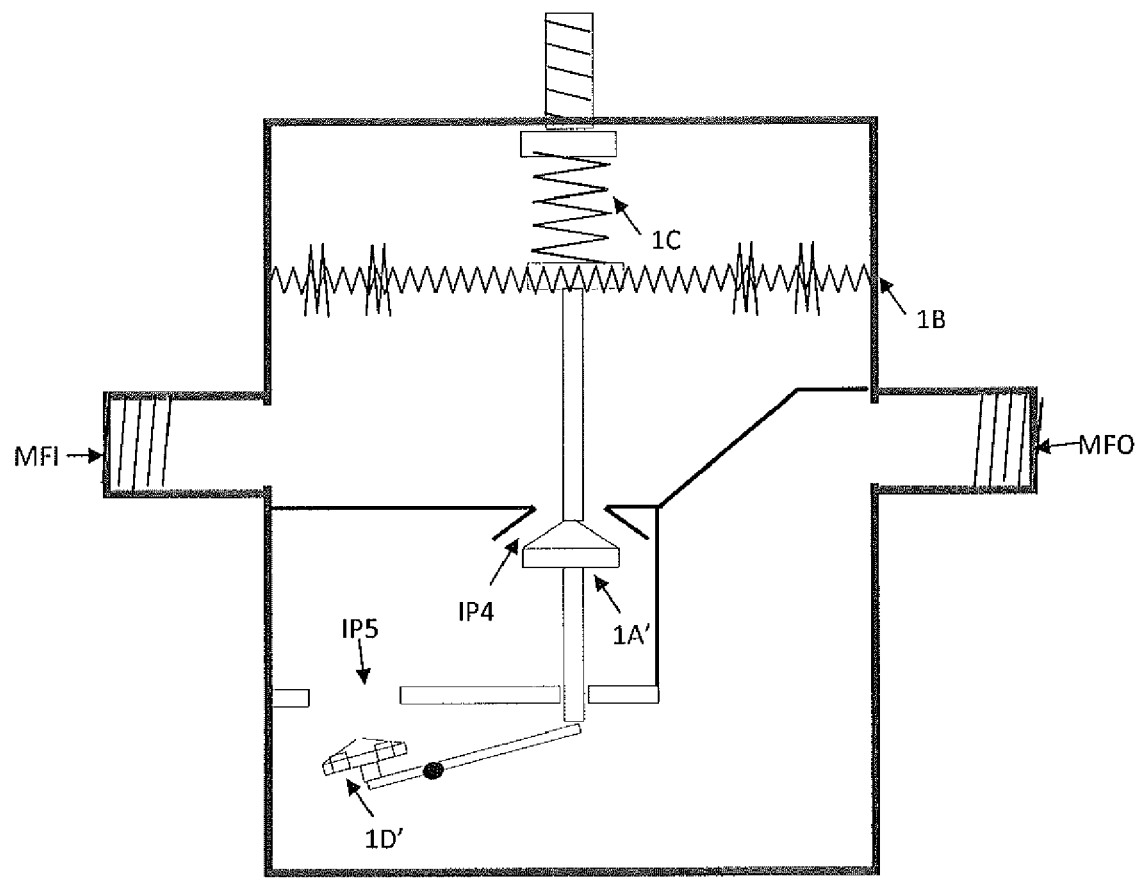
FIG. 4 shows a second embodiment for the present invention.

FIG. 4 shows a second embodiment for the present invention based on the same principles of the first embodiment. As mentioned before, a first poppet 1A' regulates the flow of fluid through an internal path IP4. The flow continues towards another internal path IP5. In the instant case the first poppet 1A' is mechanically coupled to another second poppet 1D' wherein the displacement of the first poppet 1A' acts on the second poppet 1D'. Different from the first embodiment the poppets contacts different internal paths.

Adding to the above mentioned sub-systems the valve system comprises the pressure normalization and timer sub-system comprising a fluid-based (or mechanical or electrical) timing device to enable protection when a normal flow exceeds the allowed or pre-determined time. The pressure normalization and timer sub-system implementation requires the normalization of pressures to maintain a known pressure differential for repeatable timing interval. In order to accomplish the normalization of pressure for repeatable timing intervals the present system incorporates a differential pressure regulator valve and a timer, wherein said timer is implemented by a variation of the "dashpot timer" DT as shown in FIG. 5.

Figure 5:
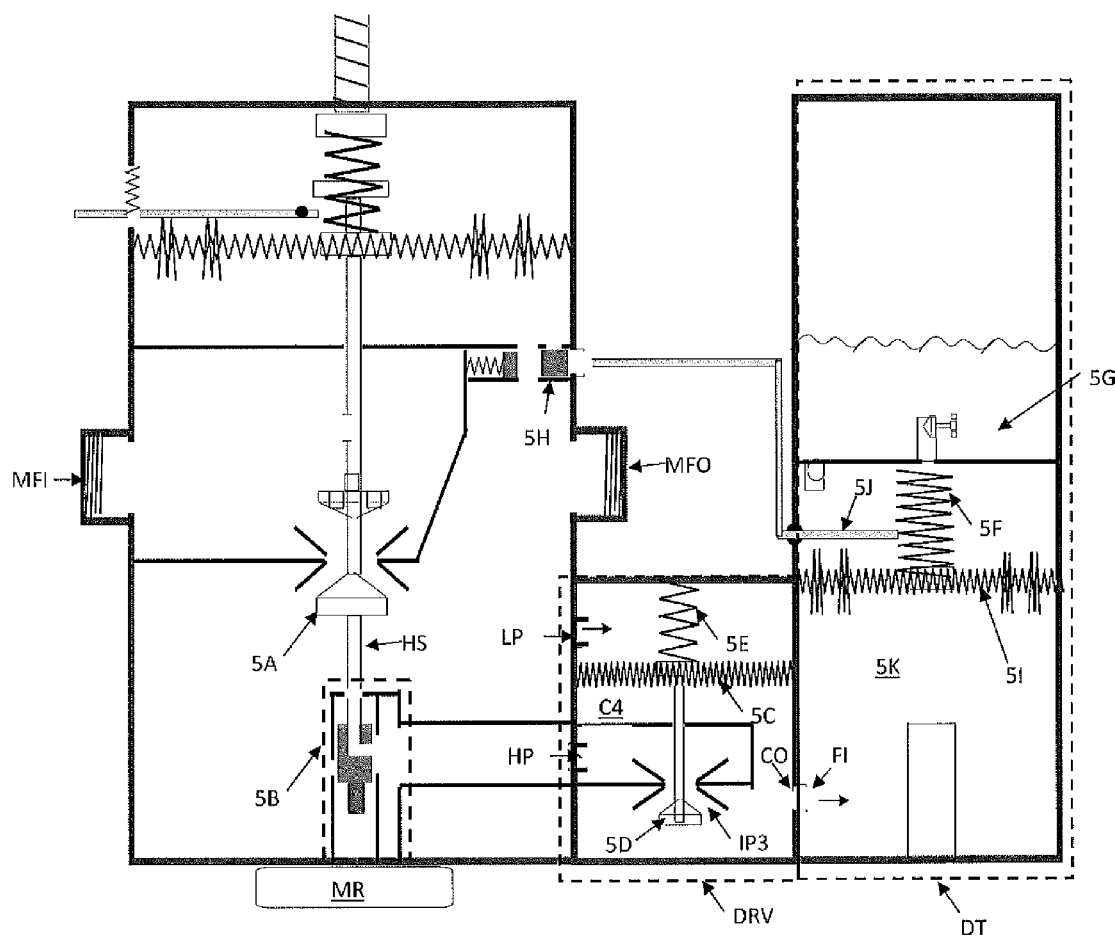
FIG. 5 shows the application of an embodiment of the present invention.

FIG. 5 shows a first control valve 5B that will provide a sample of the low "regulated" pressure LP of the (downstream) of the main regulator valve to the differential regulator valve DRV when the first poppet 5A is completely closed, and provides a sample of the high pressure (upstream) HP obtained through the hollow shaft HS of the main regulator valve at any time when said first control valve 5B is open. The sample will be fed to the high pressure HP inlet (upstream) of the differential regulator valve DRV. In addition the low pressure of the main regulator valve will be fed as the pressure reference chamber to the upper part of the diaphragm 5C. There is a fluid inlet with variable high pressure acting on the third poppet valve 5D. There is a main fluid outlet MFO also acting on the third poppet 5D and on the diaphragm 5C through the opening of first control valve 5B to the diaphragm cavity or chamber. Further, a resilient mechanism, such as a spring 5E, counteracts the forces on the diaphragm 5C in addition or combined with the reference low pressure LP sampled from main regulator valve. When the inlet pressure is reduced the diaphragm 5C and the third poppet 5D are displaced downward opening a third internal path IP3 of the system valve and increasing the flow and pressure on the outlet while at the same time increasing the pressure on the diaphragm 5C and proportionally closing the third poppet 5D until the pressures of the fluid and spring 5E in combination with the reference pressure acting on the diaphragm 5C are balanced. This provides a stable pressure that is directly proportional to the low reference pressure plus a determined pressure as set by the fixed selected spring 5E. When first poppet 5A of the main regulator valve is completely closed, the first control valve 5B is providing the low pressure downstream of main regulator, wherein said low pressure downstream of main regulator is equal to the reference low pressure on the differential regulator, resulting in an output pressure of the differential regulator equal to the downstream low pressure of the main regulator. When the first poppet 5A of the main regulator valve is open, the result is an output pressure of the differential regulator equal to the downstream low pressure of the main regulator plus a predetermined constant pressure. This differential pressure over the main regulator pressure is constant, meaning that not matter the adjustment of the main regulator downstream pressure is, the output pressure difference of the differential regulator between the 2 states offered by the first control valve 5B will be constant as long as the difference of the upstream and downstream on main regulator valve are above or equal to the predetermined differential pressure of the differential pressure regulator valve.

This differential regulator DRV provides a known difference of pressures for the 2 states of the timer. This means that the timer will fill by stable difference in hydraulic or pneumatic forces. As soon as there is some flow as admitted through the first poppet 5A on the main regulator valve, the first control valve 5B injects the high pressure which is referenced to a predetermined force inserting a fluid to the diaphragm 5I moving it upwards as fluid is moved from primary chamber 5K to secondary chamber 5G through a needle orifice against the force exerted by the remainder low pressure (equal to the downstream pressure of the main regulator) and the spring 5F.

After the predetermined amount of time the diaphragm 5I rises enough to activate the second control valve 5H on the main regulator valve by means of an external actuator 5J initiating the previously described protection mode activated by pushing such valve and then releasing it by a snap action after full travel of control valve plunger is completed. the predetermined amount of time the diaphragm 5I rises enough to activate the second control valve 5H on the main regulator valve by means of a external actuator initiating the previously described protection mode activated by pushing such valve and then releasing it by a snap action after full travel of control valve plunger is completed. At this point the timer remains in the activated upper position, until the system is reset by the previously described process. After the first poppet 5A is reset the main regulator travels all the way upward, changing the position of the first control valve 5B to pass the low pressure to the timer chamber which at the same time by the force of the spring 5F plus the low pressure at the top of diaphragm 5I and the action of the one way ball check valve responds by returning the timing fluid back to the original chamber, and the system is ready for next timing as soon as there is any flow on the line or appliance. The fluid used to time through the needle orifice is independent of the fluid being moved to push the diaphragm in order to exclude the possibility of fouling and clogging of the delicate pin hole of the needle.

The present invention, as disclosed above, presents a fluid flow control system that detects and prevents fluid leakage comprising a valve system wherein said valve system comprises; main fluid inlet MFI, main fluid outlet MFO, a plurality of internal paths IP1, IP2, wherein said plurality of internal paths IP1, IP2 comprises a first internal path IP1 for a flow, a plurality of chambers C1, C2, C3, wherein said plurality of chambers C1, C2, C3 comprises a first chamber C1, plurality of sub-systems, wherein said plurality of subsystems comprises a pressure regulator sub-system, a continuous measuring sub-system and a automatic shut off sub-system, wherein said pressure regulator sub-system comprises a first device or poppet 1A that regulates the flow by means of a first device 1A displacement with respect to said first internal path and wherein said automatic shut off system comprises a second device or poppet 1D that regulates the flow by means of a second device 1D displacement, wherein said second device 1D displacement is induced by said first device 1A displacement that overrides the first device pressure and flow controlling action at an adjustable flow rate.

Further fluid flow comprises a second internal path IP2 for the flow and wherein said pressure regulator sub-system comprises a first resilient mechanism or diaphragm 111 having reciprocal motion, wherein said first resilient mechanism is mechanically connected to said first device 1A and actuates said first device 1A displacement in response to the flow at the second internal path IP2, and wherein said first device 1A displacement is a rrarget1 to control the flow at said first internal path IP1 and gradually closes or opens said first internal path IP1.

In addition the second device 1D is mechanically coupled to said first device 1A, wherein said connecting means mechanically transfers the first device 1A displacement to said second device 1D displacement, wherein said second device 1D displacement is in the opposite direction of said first device 1A displacement with respect to the first internal path generating a concurrent hydraulic or pneumatic positive feedback automatic control system of downstream fluid pressure that overrides the first device pressure and flow controlling action at an adjustable flow rate.

Moreover the continuous measuring system comprises a protection mode signal generator or magnetic relay MR, and wherein said protection mode signal generator MR comprises a protection signal indicating that the valve is shut off.

Also the control system that detects and prevents fluid leakage comprises a third device or control valve 1E that regulates the flow, wherein said third device controls the flow at said second internal path IP2 by means of closing or opening said second internal path IP2. Further, said third device 1E is activated by an external actuator 5J, wherein said external actuator 5J is mechanically coupled to a pressure normalization and timer sub-system, wherein the pressure normalization and timer sub-system comprises a differential pressure regulator valve and a timing device, wherein said timing device is selected from a fluid timing device DT, a mechanical timing device and an electrical timing device.

Furthermore said differential pressure regulator valve comprises a regulator chamber C4, a regulator or first control valve 5B and a second resilient mechanism, wherein said regulator chamber C4 comprises a low pressure inlet LP, a high pressure inlet HP, and an chamber outlet CO, wherein said control valve regulates part of the flow incoming to the high pressure inlet HP and is mechanically coupled to the first device, wherein said second resilient mechanism comprises a second diaphragm 5C and a second spring 5E, wherein said second diaphragm 5C and said second spring 5E are mechanically coupled to a fourth device or poppet 5D that regulates the flow into the coming from the high pressure inlet HP.

Additionally the said fluid timing device DT comprises a primary chamber 5K, a secondary chamber 5G, a third resilient mechanism 5I, 5F, wherein said primary chamber 5K comprises a fluid timing inlet FI connected to the regulator chamber outlet CO, wherein said third resilient mechanism comprises a third diaphragm 5I and a third spring 5F, wherein said third diaphragm 5I and said third spring 5F are mechanically coupled to said external actuator device 5J.

While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patentable distinguish any amended claims from any applied prior art.

The invention claimed is:

1. A fluid flow control system that detects and prevents fluid leakage comprising a valve system wherein said valve system comprises;
  a. a main fluid inlet,
  b. a main fluid outlet,
  c. a plurality of chambers, wherein said plurality of chambers comprises a first chamber, a second chamber and a third chamber
  d. a plurality of internal paths, wherein said plurality of internal paths comprises a first internal path for a flow, wherein said first internal path is located between the first chamber and the second chamber,
  e. a plurality of sub-systems, wherein said plurality of subsystems comprises a pressure regulator sub-system, a continuous measuring sub-system and a automatic shut off sub-system, wherein said pressure regulator sub-system comprises a first device that regulates the flow by means of a first device displacement with respect to said first internal path; and
  f. wherein said automatic shut off system comprises a second device that regulates the flow by means of a second device displacement, wherein said second device displacement is induced by said first device displacement that overrides the first device pressure and flow controlling action at an adjustable flow rate,
  g. wherein said plurality of internal paths comprise a second internal path for the flow located between the second chamber and third chamber; and
    wherein said pressure regulator sub-system comprises a first resilient mechanism having reciprocal motion, wherein said first resilient mechanism is mechanically connected to said first device and actuates said first device displacement in response to the flow at the second internal path, and wherein said first device displacement is arranged to control the flow at said first internal path and gradually closes or opens said first internal path, wherein said automatic shut off system comprises a third device that regulates the flow, wherein said third device controls the flow at said second internal path by means of closing or opening said second internal path, wherein said third device is activated by an external actuator, wherein said external actuator is mechanically coupled to a pressure normalization and timer sub-system, wherein the pressure normalization and timer subsystem comprises a differential pressure regulator valve and a timing device, wherein said timing device is selected from a fluid timing device, a mechanical timing device, and an electrical timing device.

2. A fluid flow control system that detects and prevents fluid leakage as in claim 1 wherein said resilient mechanism is selected from a piston and a diaphragm with a spring.

3. A fluid flow control system that detects and prevents fluid leakages as in claim 1, wherein said second device is mechanically coupled by connecting means to said first device, wherein said connecting means comprises members mechanically connected to transfers the first device displacement to said second device, wherein said second device displacement is in the opposite direction of said first device displacement with respect to the first internal path generating a concurrent hydraulic or pneumatic positive feedback automatic control system of downstream fluid pressure that overrides the first device pressure and flow controlling action at an adjustable flow rate.

4. A fluid flow control system that detects and prevents fluid leakage as in claim 1, wherein said third device is activated by an external actuator selected from a timer, liquid activated logic devices and an electrical apparatus.

5. A fluid flow control system that detects and prevents fluid leakage as in claim 1, wherein said continuous measuring system comprises a protection mode signal generator, and wherein said protection mode signal generator comprises a protection signal indicating that the valve system is shut off.

6. A fluid flow control system that detects and prevents fluid leakage as in claim 1, wherein said several sub-systems comprises a reset sub-system, wherein said reset sub-system comprises a lever, wherein said lever is mechanically coupled to the first device and said second device.

7. A fluid flow control system detects and prevents fluid leakage as in claim 1, wherein said differential pressure regulator valve comprises a regulator chamber, a regulator control valve and a second resilient mechanism,
wherein said regulator chamber comprises a low pressure inlet, a high pressure inlet, and an chamber outlet,
wherein said control valve regulates part of the flow incoming to the high pressure inlet and is mechanically coupled to the first device,
wherein said second resilient mechanism comprises a second diaphragm and a second spring, wherein said second diaphragm and said second spring are mechanically coupled to a fourth device that regulates the flow into the coming from the high pressure inlet.

8. A fluid flow control system detects and prevents fluid leakage as in claim 1, wherein said fluid timing device comprises a primary chamber, a secondary chamber, a third resilient mechanism,
wherein said primary chamber comprises a fluid timing inlet connected to the regulator chamber outlet,
wherein said third resilient mechanism comprises a third diaphragm and a third spring, wherein said third diaphragm and said third spring are mechanically coupled to said external actuator device.

* * * * *